(12) United States Patent
Pages

(10) Patent No.: US 6,860,572 B1
(45) Date of Patent: Mar. 1, 2005

(54) STORAGE AND RETRIEVAL DEVICE FOR COMPACT DISCS

(76) Inventor: Gary M. Pages, P.O. Box 663, Sisters, OR (US) 97759

( * ) Notice: Subject to any disclaimer, the term of this patent is extended or adjusted under 35 U.S.C. 154(b) by 113 days.

(21) Appl. No.: 10/272,667

(22) Filed: Oct. 16, 2002

(51) Int. Cl.[7] .............................................. A47B 81/00
(52) U.S. Cl. ...................... 312/9.36; 312/9.14; 312/9.24
(58) Field of Search ............................. 312/9.36, 9.31, 312/9.32, 9.34, 9.37, 9.14, 9.15, 9.16, 9.24; 206/308.1

(56) References Cited

U.S. PATENT DOCUMENTS

| 1,667,216 A | * | 4/1928 | Ferdinand | 312/9.36 |
| 2,352,710 A | * | 7/1944 | Hart | 312/9.36 |
| 2,402,076 A | * | 6/1946 | Painter | 312/9.19 |
| 2,563,957 A | * | 8/1951 | Plack | 312/9.36 |
| 3,107,816 A | * | 10/1963 | Teague, Jr. et al. | 312/9.36 |
| 3,582,168 A | * | 6/1971 | Bian et al. | 312/9.36 |
| 3,794,394 A | * | 2/1974 | Berggren | 312/9.34 |
| 5,275,480 A | * | 1/1994 | Hyman et al. | 312/9.14 |
| 5,338,108 A | * | 8/1994 | Hunt et al. | 312/9.14 |
| 5,584,544 A | * | 12/1996 | Kuzara | 312/9.36 |

FOREIGN PATENT DOCUMENTS

| DE | 3149424 | * | 6/1983 | 312/9.9 |
| GB | 2071997 | * | 9/1981 | 312/9.9 |

* cited by examiner

Primary Examiner—Lanna Mai
Assistant Examiner—Hanh V. Tran
(74) Attorney, Agent, or Firm—Robert E. Howard

(57) ABSTRACT

A storage and retrieval device for compact discs (CD's) that includes a storage box divided into a plurality of CD storage units, each storage unit adapted to hold two CD's. An ejector arm is slidably positioned on, and rotatable about, a pivot rod. The ejector arm has an ejector finger located on its inner end. Upon rotation of the ejector arm about the pivot rod, the ejector finger contacts the lower end of the CD's located within the two CD receiving slots of a selected storage unit, and raises the CD's into position for retrieval.

19 Claims, 6 Drawing Sheets

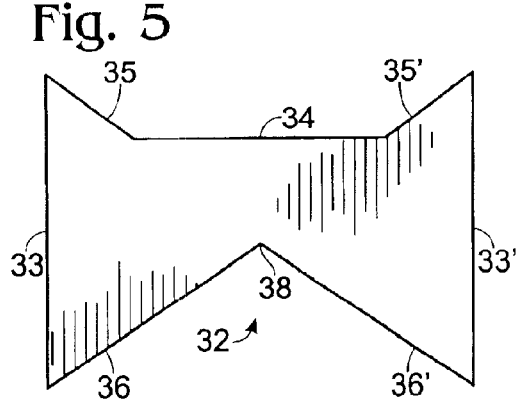
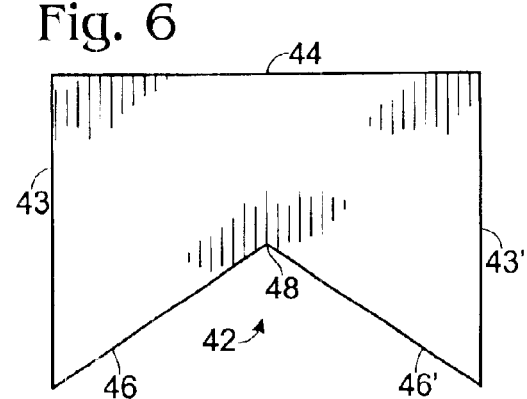
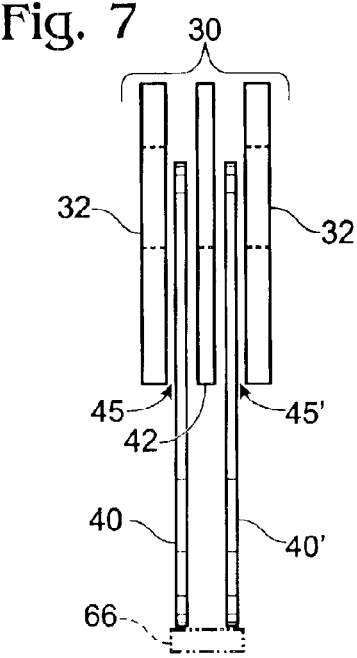
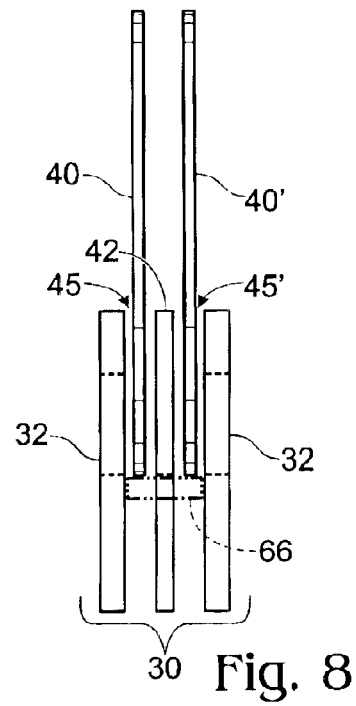

STORAGE AND RETRIEVAL DEVICE FOR COMPACT DISCS

BACKGROUND OF THE INVENTION

The present invention relates to a storage and retrieval device for compact discs. As used herein, the phrase "compact discs", and its abbreviation "ICD's ", is intended to include any compact disc used for recording information, such as those used to record music (commonly referred to as "CD's"), those used for recording video (commonly referred to as "DVDIs"), and those used to record software.

CD's come in plastic "jewel boxes" to protect the CD and to provide space for written information about the CD. A problem that arises for those CD users having a large number of CD's is the amount of space they occupy if left in their jewel boxes. Leaving CD's outside their jewel boxes is not wise since they can easily become damaged. Placing CDMs into CD storage books is not satisfactory since sliding a CD in and out of the plastic sleeve of such storage books causes excessive wear of the CD surface.

In addition to the problem of storage space, locating and retrieving a particular CD from amongst a large number of stored CD's can be a time consuming problem.

SUMMARY OF THE PRESENT INVENTION

It is an object of the present invention to provide a storage and retrieval device for CD's that allows a large number of CD'S to be stored in a relatively compact space, and to allow easy location and retrieval of a particular CD.

The CD storage and retrieval device of the present invention includes a storage box divided into a plurality of CD storage units, each CD storage unit adapted to hold two CD's. Each CD storage unit includes a pair of spacer walls and a separation wall spaced apart from and positioned between said spacer walls to thereby form two CD storage slots.

CD retrieval means for raising the CD's located within the two CD storage slots of a selected dual CD storage unit includes an ejector arm slidable upon, and rotatable about, a longitudinally extending pivot rod. The ejector arm has an ejector finger located on its inner end which, upon rotation of the ejector arm about the pivot rod, is adapted to contact the lower end of the CD's located within said two CD receiving slots, and raise the two CD's into a retrieval position.

BRIEF DESCRIPTION OF THE DRAWINGS

FIG. 5 is a front elevation view of one of the spacer walls of the CD storage and retrieval device of the present invention;

FIG. 6 is a front elevation view of one of the separation walls of the CD storage and retrieval device of the present invention;

FIG. 7 is a partial side elevation view of one storage unit of the CD storage and retrieval device of the present invention with a pair of CD's shown in their storage position;

FIG. 8 is a partial side elevation view of one storage unit of the CD storage and retrieval device of the present invention with a pair of CD's shown in their raised, retrievable position;

DESCRIPTION OF PREFERRED EMBODIMENTS

Figure 1:
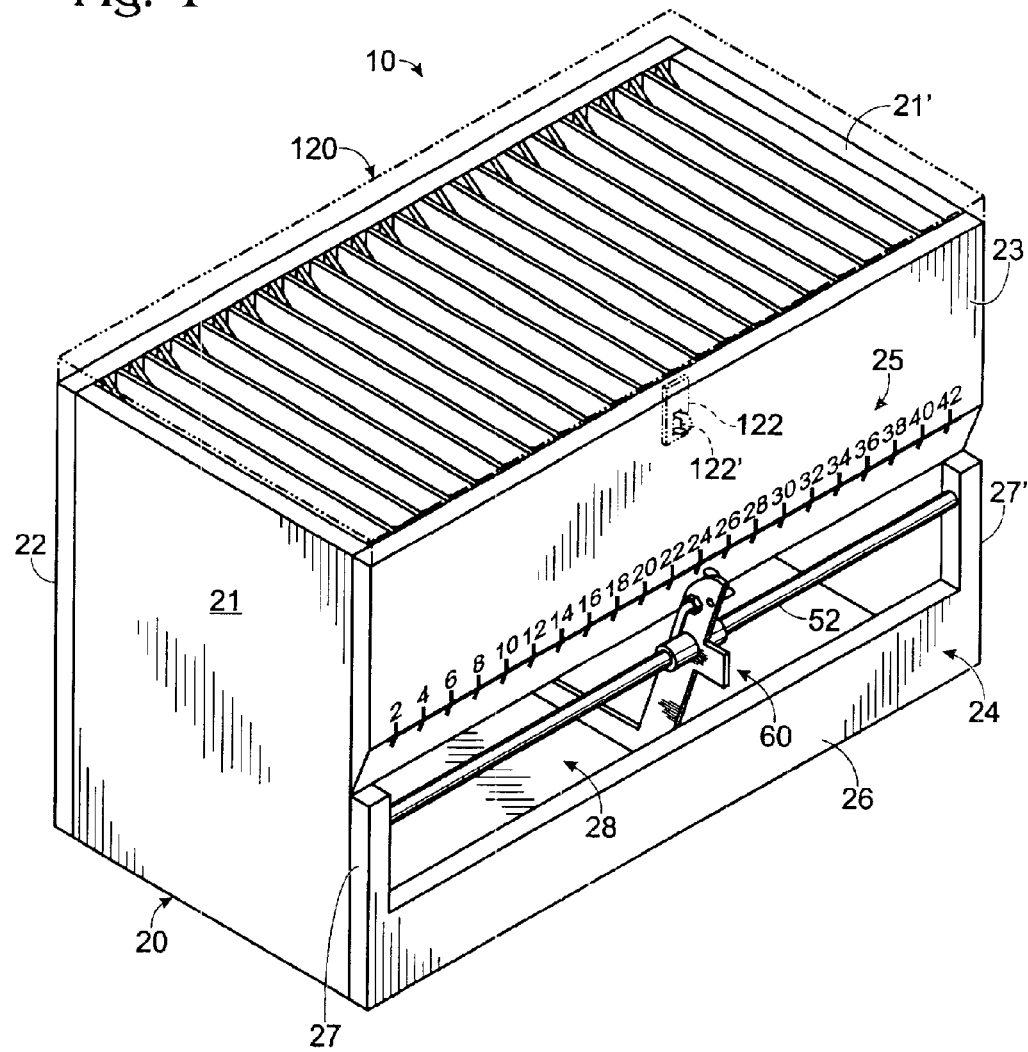
FIG. 1 is a perspective front view of the CD storage and retrieval device of the present invention, shown with its lid closed.
Figure 2:
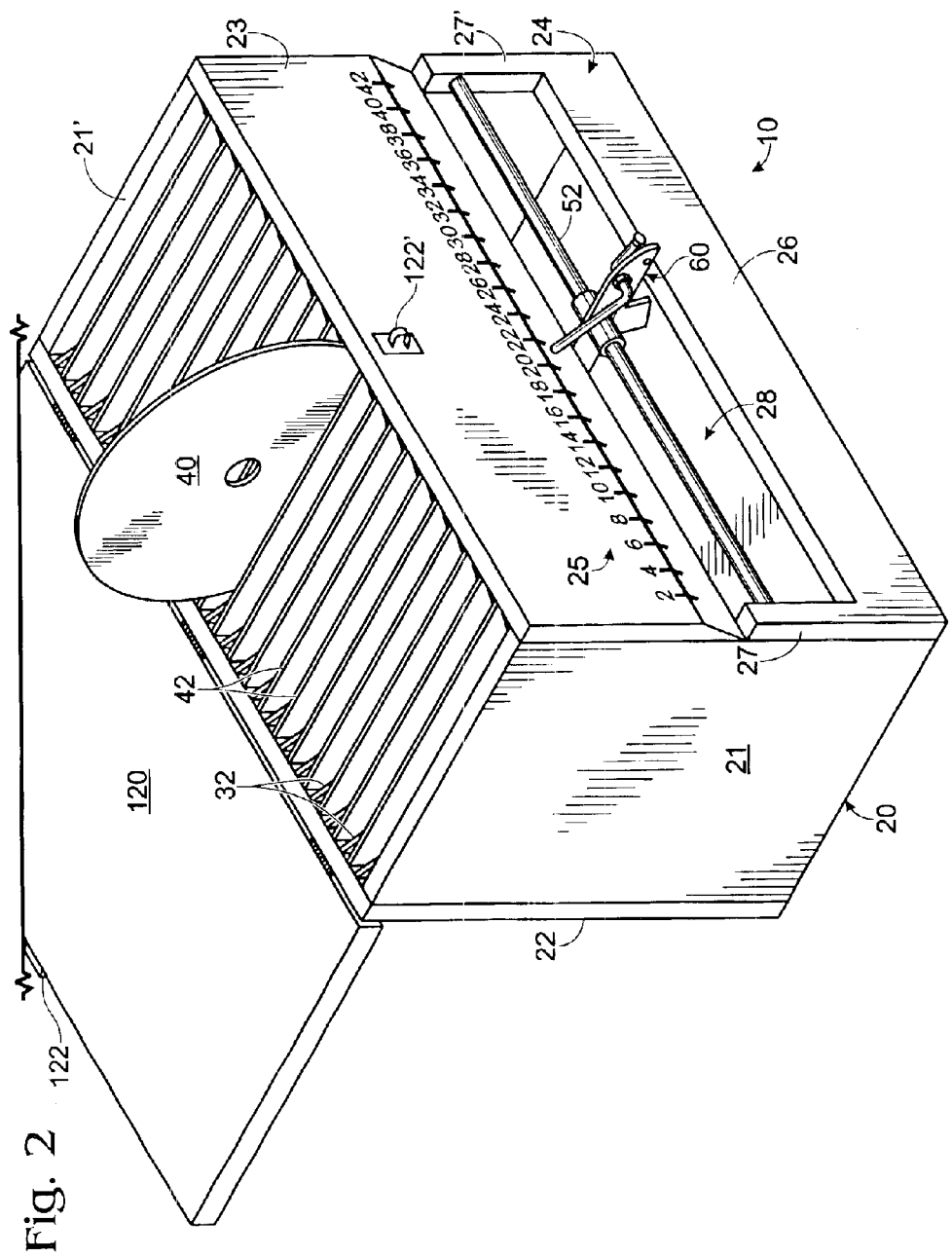
FIG. 2 is a perspective front view of the CD storage and retrieval device of the present invention, shown with its lid in the open position and with a pair of CD's shown in their raised, retrievable position.

The CD storage and retrieval device 10 of the present invention includes a storage box 20 having a lid 120 hingedly attached to rear wall 22 of box 20. Preferably, lid 120 is transparent, and may include latching members 122 and 122'.

Storage box 20 includes left and right sidewalls 21 and 21', rear wall 22, upper front wall 23 and lower front wall 24. As used herein, left and right are intended to mean those directions appearing to a viewer facing the upper and lower front walls 23 and 24 of the box 20 of CD storage and retrieval device 10.

The lower longitudinal margin of upper front wall 23 is beveled inwardly, as shown. A longitudinally disposed ruled and numbered index 25 is located on the upper front wall 24 at the location where the bevel commences.

Lower front wall 24 is U-shaped, having a base 26 and upwardly extending left and right legs 27, 27'. The upper edge of base 26 and the lower edge of upper front wall 23 are substantially parallel, and the space between them forms a longitudinal slit 28 communicating the lower interior of storage box 20 with the exterior thereof.

Figure 4:
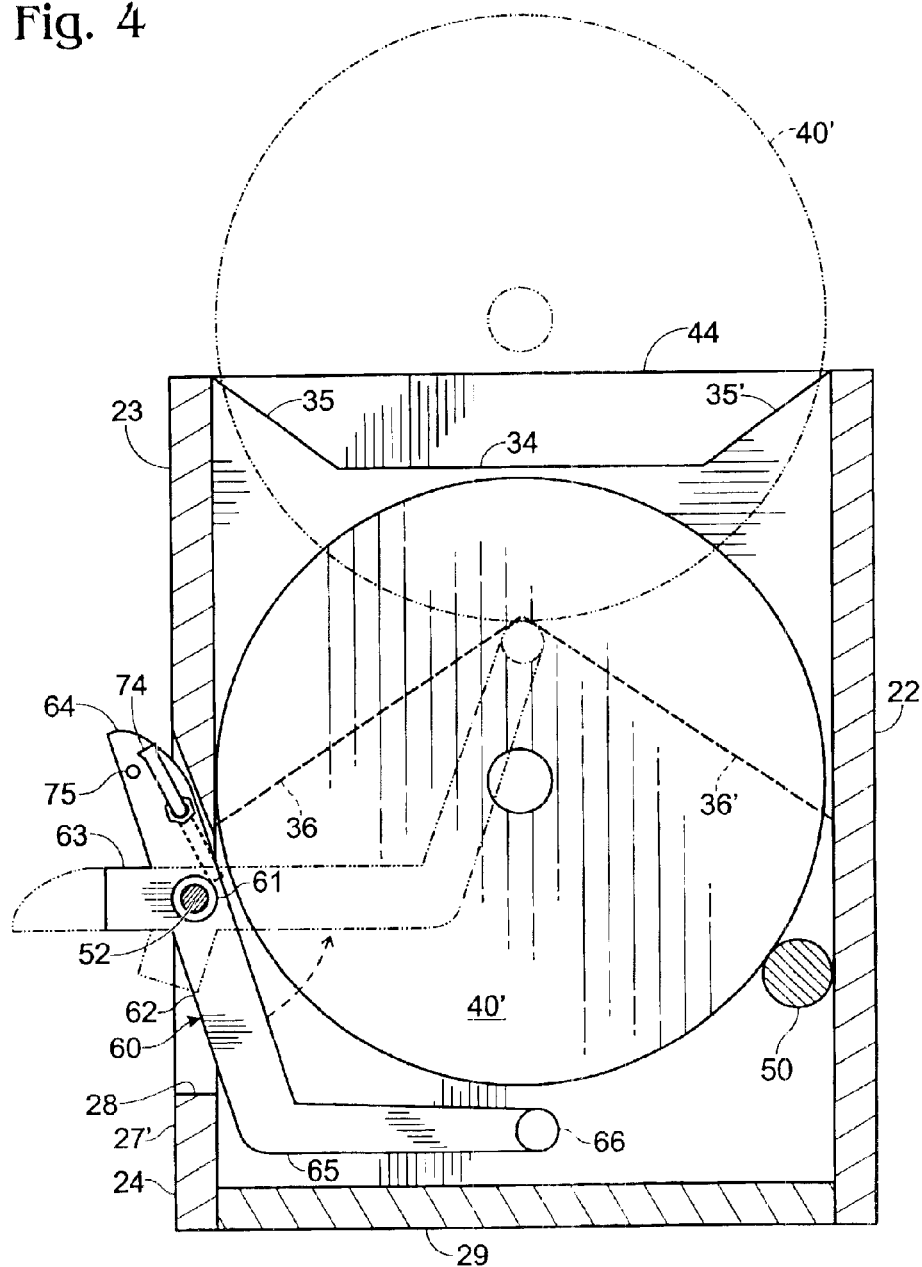
FIG. 4 is cross-sectional view taken along the plane of a CD shown stored in the CD storage and retrieval device of the present invention, and showing in phantom the CD in its raised, retrievable position.

Storage box 20 may, optionally, include a floor 29 (as seen in FIG. 4).

As best seen in FIGS. 7 and 8, the interior of storage box 20 is divided into a plurality of dual CD storage units 30 formed by a plurality of spacer walls 32 and separation walls 42. Each dual CD storage unit 30 includes a pair of identical spacer walls 32, each spacer wall 32 having the profile shown in FIG. 5. Except for the first and last dual CD storage unit 30, each dual CD storage unit 30 shares both of its spacer walls 32 with immediately adjacent dual CD storage units 30.

As best seen in FIG. 5, spacer wall 32 includes a pair of vertical side edges 33, 33', a horizontal upper edge 34, sloping upper edges 35, 35', and sloping lower edges 36, 36' which come together at an apex 38 to form an inverted V-shaped bottom.

A separation wall 42, having the profile shown in FIG. 6, is located mid-way between spacer walls 32, the major planes of spacer walls 32 and separation wall 42 being substantially parallel. As best seen in FIG. 6, separation wall 42 includes a pair of vertical side edges 43, 43', a horizontal upper edge 44, and sloping lower edges 46, 46' which come together at an apex 48 to form a V-shaped bottom.

The widths of spacer wall 32 and separation wall 42 are identical. Side edges 33, 33' of spacer wall 32 have a height that is identical to the height of side edges 43, 43' of separation wall 42. Sloping lower edges 36, 36' of spacer wall 32 have angles that are identical to the angles of sloping lower edges 46, 46' of separation wall 42 to thereby form congruent V-shaped bottoms. Thus, the only difference in the profiles of spacer wall 32 and separation wall 42 is that spacer wall 32 has an upper horizontal edge 34 that is recessed below upper horizontal edge 44 of separation wall 42, as can best be seen in FIG. 4.

As best seen in FIG. 4, spacer walls 32 and separation walls 42 extend between rear wall 22 and upper front wall 23, and may be attached thereto in any suitable manner, such as by press fitting the side edges 33, 33' and 43, 43' of the spacer wall 32 and separation wall 42, respectively, into vertical grooves (not shown) located in the inner surfaces of rear wall 22 and upper front wall 23.

As best seen in FIG. 7, two CD's 40, 40' are placed into each CD storage unit 30 by inserting the two CD's within the two CD storage slots or pockets 45, 45' formed between the two spacer walls 32 and separation wall 42. The two CD's 40, 40' are preferably placed within CD storage slots 45, 45' with their labels facing outwardly, their inner surfaces being separated from each other by separation wall 42. By virtue of spacer walls 32 having recessed upper edges 34, it is easier to insert the CD's 40, 40' into their respective storage slots 45, 45'.

Figure 3:
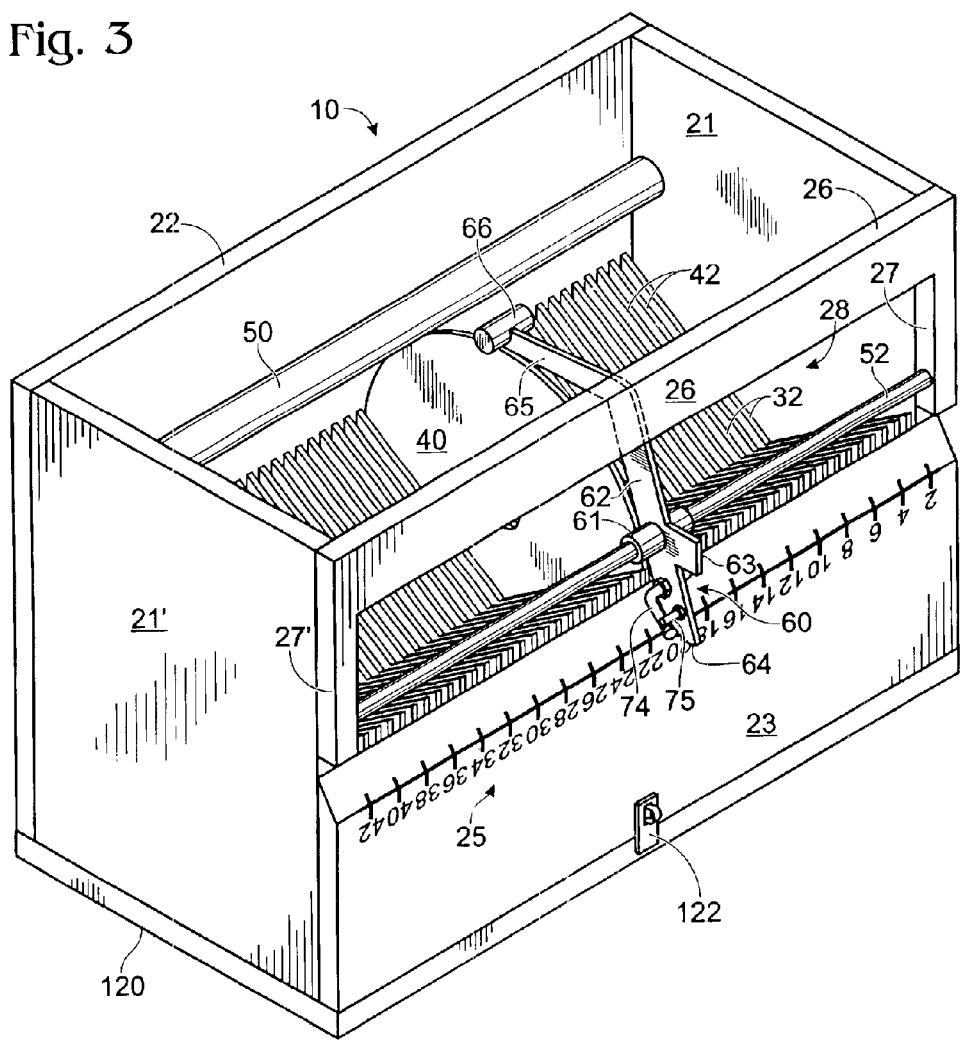
FIG. 3 is a perspective bottom view of the CD storage and retrieval device of the present invention.

As best seen in FIGS. 3 and 4, the CD's 40, 40' are partially supported by abutment against a support rod 50 positioned adjacent a lower portion of rear wall 23 and extending between, and attached to, sidewalls 21 and 21'. The CD's 40, 40' also abut loosely and slidingly against the inner surface of rear wall 22 and upper front wall 23, as best seen in FIG. 4.

The mechanism for raising the CD's out of their storage unit 30 for retrieval will now be described.

A pivot rod 52 extends longitudinally between, and is attached to, left and right legs 27 and 27' of lower front wall 24. Pivot rod 52 is located within slot 28, and substantially parallel to the upper edge of base 26 of lower front wall 24.

An ejector arm 60 has an ejector arm sleeve 61 extending therethrough at an upper arm portion 62 thereof. Pivot rod 52 extends through ejector arm sleeve 61, and ejector arm 60 can be pushed longitudinally back and forth along pivot rod 52 by means of positioning tab 63 extending outwardly from upper arm portion 62 adjacent the location of ejector arm sleeve 61.

As best seen in FIG. 4, the outer end 64 of ejector upper arm portion 62 is located adjacent to beveled lower edge of upper front wall 23.

The lower portion of ejector upper arm portion 62 extends through slot 28.

A lower ejector arm portion 65 extends outwardly at an angle from the lower end of upper ejector arm portion 62, and has an ejector finger 66 extending perpendicularly outwardly in both directions from its innermost (outer) end for a distance sufficient to enable ejector finger 66 to contact the bottom edges of both CD's 40, 40'.

Figure 9:
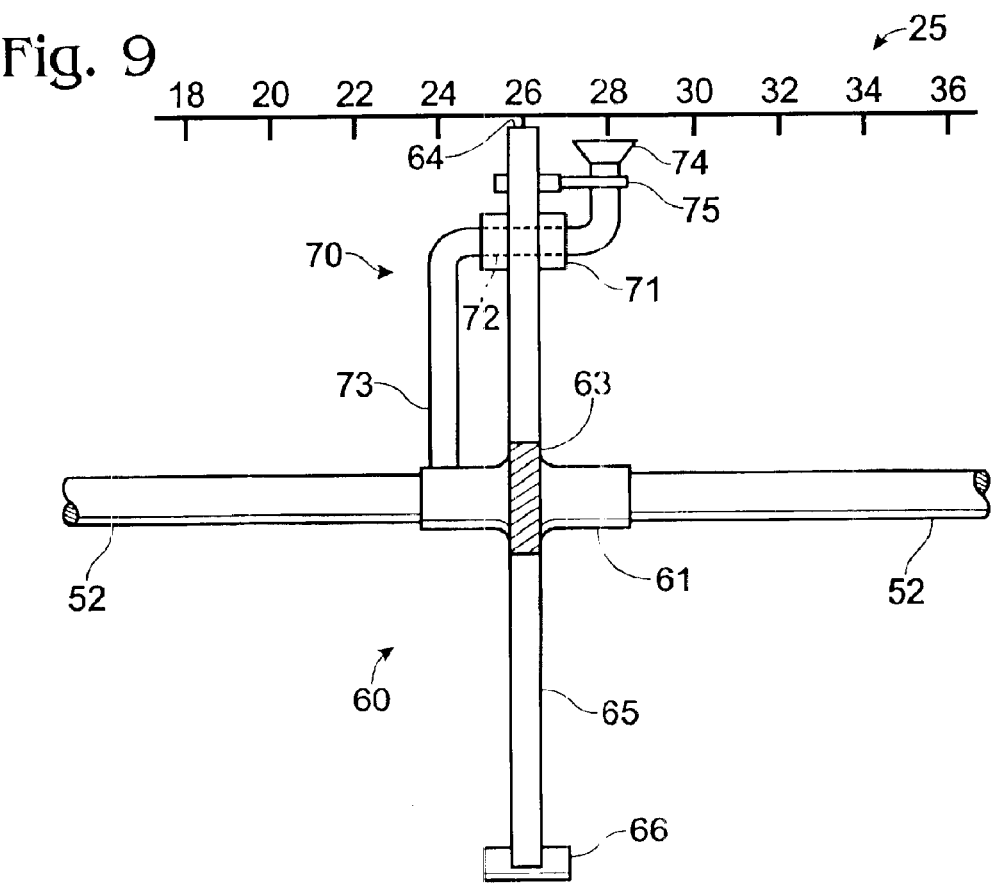
FIG. 9 is an enlarged front elevation view of the ejector lever of the CD storage and retrieval device of the present invention shown in its lowered position.

As best seen in FIG. 9, an ejector arm locking mechanism 70 is located in the upper portion of ejector upper arm portion 62. Ejector arm locking mechanism 70 includes a pivot pin sleeve 71 extending through ejector upper arm portion 62. A pivot pin axle 72 extends through pivot pin sleeve 71. The left outer portion of pivot pin axle 72 bends vertically downwardly to form pivot pin 73. The right outer portion of pivot pin axle 72 bends vertically upwardly to form pivot pin positioning lever 74.

In operation, a user consults an appropriately located list of CD's to determine the numbered storage unit 30 wherein the desired CD resides. For example, the list could be contained in a plastic sleeve attached to left or right sidewall 21 or 21'. Since two CD's are located within each storage unit 30, index 25 need only display all even numbers, it being understood by a user that if a listed CD has an odd number it would be located in that storage unit 30 having the next highest even number.

Positioning tab 63 is used to position the outer end 64 of ejector arm 60, opposite the index 25 number of the storage unit 30 desired. For example, if the CD list shows that the desired CD is either number 25 or 26, positioning tab 63 is moved to position outer end 64 of ejector arm 60 opposite the number "26" of index 25 (as seen in FIG. 9). Thus, outer end 64 of ejector arm 60 acts as an index finger.

Outer end 64 of ejector arm 60 is then rotated downwardly, causing ejector arm 60 to pivot about pivot rod 52 and causing ejector finger 66 to come into contact with the bottoms of the two CD's located within the selected storage unit 30. Further rotation of ejector arm 60 raises the CD's from their lower, stored position, to their raised, retrieval position, as best seen in FIGS. 4, 7 and 8.

Figure 10:
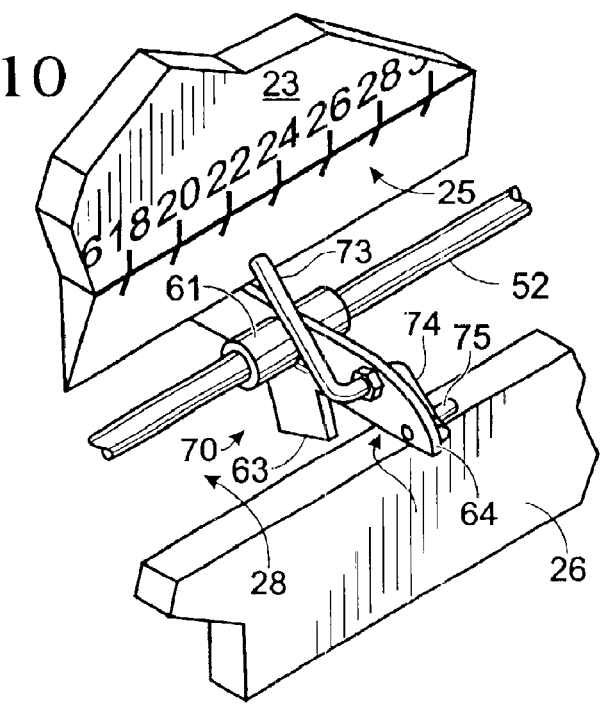
FIG. 10 is an enlarged left side perspective view of the ejector lever of the CD storage and retrieval device of the present invention in its raised position and showing the ejector arm locking mechanism in its locking position.

Upon raising ejector arm upper portion 62 to a substantially horizontal position (as seen in phantom in FIG. 4), ejector finger 66 abuts against apexes 38 and 48 of spacer walls 32 and separation wall 42, respectively, of the selected storage unit 30. Ejector arm 60 can be held in this position by rotation of pivot pin positioning lever 74 from a substantially horizontal position vertically downwardly to thereby cause pivot pin 73 to rotate vertically upwardly until pivot pin positioning lever 74 comes into abutment with stop member 75 and the outer end of pivot pin 73 comes into substantially perpendicular abutment with the beveled lower edge of upper front wall 23 (as best seen in FIG. 10).

It will be obvious to those having skill in the art that many changes may be made to the details of the above-described embodiments of this invention without departing from the underlying principles thereof. The scope of the present invention should, therefore, be determined only by the following claims.

The invention claimed is:

1. A storage and retrieval device for CD's comprising:
a storage box having right and left sidewalls, a rear wall, spaced apart upper and lower front walls, an access slot formed between said spaced apart upper and lower front walls, said storage box being divided into a plurality of vertically disposed CD storage units, each said CD storage unit including a pair of spacer walls and a separation wall spaced apart from and positioned between said spacer walls to thereby form two CD storage slots adapted to receive two CD's; and
retrieval means for raising two CD's located within the two CD storage slots of a selected dual CD storage unit, said retrieval means including an ejector arm slidable on, and rotatable about, a pivot rod, said ejector arm having an upper arm portion and a lower arm portion, said lower arm portion extending outwardly at an angle to said upper arm portion, the lower arm portion of said ejector arm extending through said access slot into the interior of said storage box, said lower arm portion having an outer end having an ejector finger located thereon, said ejector finger being adapted, upon rotation of said sector arm about said pivot rod, to come into contact with the lower edges of only those CD's located within said two CD storage slots and to raise said CD's to a CD retrievable position.

2. The storage and retrieval device of claim 1 including CD supporting means for supporting CD's located within said CD storage slots, said CD supporting means positioned to abut said CD's on their peripheral edges at a location between the mid-point and lower edge of said CD's.

3. The storage and retrieval device of claim 2 wherein said CD supporting means is a longitudinal rod extending between and attached to said sidewalls.

4. The storage and retrieval device of claim 1 including an index located on the upper front wall adjacent said access slot, said index exhibiting horizontally disposed consecutive numbers, each of said numbers being in alignment with a CD storage unit.

5. The storage and retrieval device of claim 4 wherein said consecutive numbers are selected from the group consisting of consecutive even numbers and consecutive odd numbers.

6. The storage and retrieval device of claim 1 including an ejector arm locating mechanism adapted to hold said ejector arm in said CD retrievable position.

7. The storage and retrieval device of claim 6 wherein said ejector arm locating mechanism is a pivot pin located adjacent the outer end of said ejector am said pivot pin having an outer end adapted to be rotated into contact with said upper front wall of said storage box when said ejector arm is in said CD retrievable position.

8. The storage and retrieval device of claim 5 wherein said upper arm portion of said ejector arm has an outer end that, upon sending said ejector arm along said pivot rod, can be positioned opposite one of said numbers.

9. A storage and retrieval device for CD's comprising:
a storage box having right and left sidewalls, a rear wall, spaced apart upper and lower front walls, an access slot being formed between said spaced apart upper and lower front walls, said storage box being divided into a plurality of vertically disposed CD storage units, each said CD storage unit including a pair of spacer walls and a separation wall spaced apart from and positioned between said spacer walls to thereby form two CD storage slots, said spacer walls and said separation walls extending between, and attached to, said rear wall and said upper front wall, said spacer walls and said separation walls each having sloping lower edges that form congruent inverted V-shaped bottoms; and
retrieval means for raising CD's located within the two CD storage slots of a selected dual CD storage unit, said retrieval means including an ejector arm slidable on, and rotatable about, a pivot rod, said ejector arm having an upper arm portion and a lower arm portion, said lower arm portion extending outwardly at an angle to said upper arm portion, the lower arm portion of said ejector arm extending through said access slot into the interior of said storage box, said lower arm portion having an outer end having an ejector finger located thereon, said ejector finger being adapted, upon rotation of said ejector arm about said pivot rod, to come into contact with the lower edges of CD's located within said two CD storage slots and to raise said CD's to a CD retrievable position.

10. The storage and retrieval device of claim 9 including CD supporting means for supporting CD's located within said CD storage slots, said CD supporting means positioned to abut said CD's on their peripheral edges at a location between the mid-point and lower edge of said CD's.

11. The storage and retrieval device of claim 10 wherein said CD supporting means is a longitudinal rod extending between and attached to said sidewalls.

12. The storage and retrieval device of claim 9 including an ejector arm locking mechanism adapted to hold said ejector arm in said CD retrievable position.

13. The storage and retrieval device of claim 12 wherein said ejector arm locking mechanism is a pivot pin located adjacent the outer end of said ejector arm, said pivot pin having an outer end adapted to be rotated into contact with said upper front wall of said storage box when said ejector arm is in said CD retrievable position.

14. The storage and retrieval device of claim 9 wherein said spacer walls and said separation walls each have an upper horizontal edge, said upper horizontal edges of said spacer walls being recessed below said upper horizontal edges of said separation walls.

15. A storage and retrieval device for CD's comprising:
a storage box having right and left sidewalls, a rear wall spaced apart upper and lower front walls, an access slot being formed between said spaced apart upper and lower front walls, said storage box being divided into a plurality of vertically disposed CD storage units, each said CD storage unit including a pair of spacer walls and a separation wall spaced apart from and positioned between said spacer walls to thereby form two CD storage slots, said spacer walls and said separation walls each having an upper horizontal edge, said upper horizontal edges of said spacer walls being recessed below said upper horizontal edges of said separation walls; and
retrieval means for raising CD's located within the two CD storage slots of a selected dual CD storage unit, said retrieval means including an ejector arm slidable on, and rotatable about a pivot rod, said ejector arm having an upper arm portion and a lower arm portion, said lower arm portion extending outwardly at an angle to said upper arm portion, the lower arm portion of said ejector arm extending through said access slot into the interior of said storage box, said lower arm portion having an outer end having an ejector finger located thereon, said ejector finger being adapted upon rotation of said ejector arm about said pivot rod, to come into contact with the lower edges of CD's located within said two CD storage slots and to raise said CD's to a CD retrievable position.

16. The storage and retrieval device of claim 15 including CD supporting means for supporting CD's located within said CD storage slots, said CD supporting means positioned to abut said CD's on their peripheral edges at a location between the mid-point and lower edge of said CD's.

17. The storage and retrieval device of claim 16 wherein said CD supporting means is a longitudinal rod extending between and attached to said sidewalls.

18. The storage and retrieval device of claim 15 including an ejector arm locking mechanism adapted to hold said ejector arm in said CD retrievable position.

19. The storage and retrieval device of claim 18 wherein said ejector arm locking mechanism is a pivot pin located adjacent the outer end of said ejector arm, said pivot pin having an outer end adapted to be rotated into contact with said upper front wall of said storage box when said ejector arm is in said CD retrievable position.

* * * * *